J. MUCK.
ROLLER SKATE.
APPLICATION FILED AUG. 19, 1918.

1,393,813.

Patented Oct. 18, 1921.

Inventor
John Muck
By Erwin & Wheeler
Attorneys.

UNITED STATES PATENT OFFICE.

JOHN MUCK, OF MILWAUKEE, WISCONSIN.

ROLLER-SKATE.

1,393,813.  Specification of Letters Patent.  Patented Oct. 18, 1921.

Application filed August 19, 1918. Serial No. 250,480.

*To all whom it may concern:*

Be it known that I, JOHN MUCK, a citizen of the United States, residing at the city of Milwaukee, county of Milwaukee, and State of Wisconsin, have invented new and useful Improvements in Roller-Skates, of which the following is a specification.

My invention relates to improvements in roller skates. The same is explained by reference to the accompanying drawings.

Like parts are referred to by same reference numerals throughout the several views.

Figure 1:
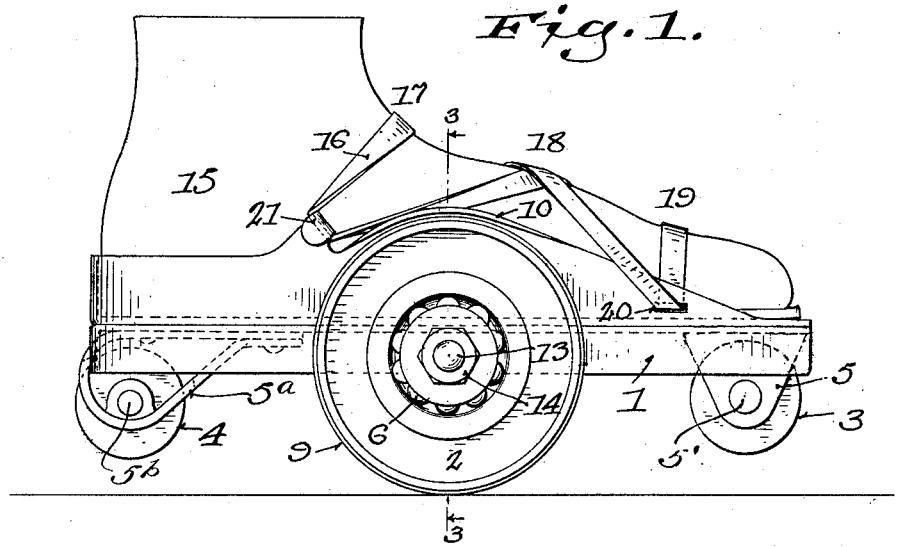
Figure 1 represents side view.
Figure 2:
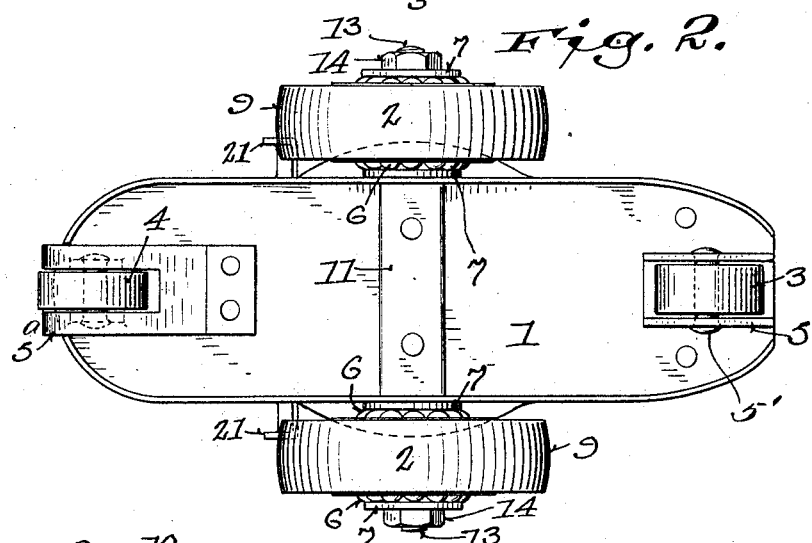
Fig. 2 represents plan view.
Figure 3:
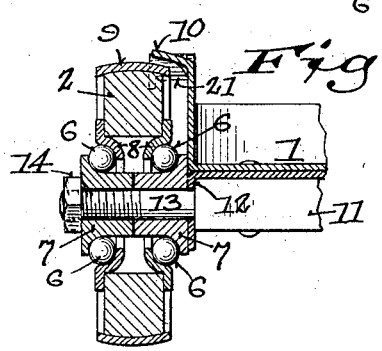
Fig. 3 represents a detail of section drawn on line 3—3 of Fig. 1.

1 represents the platform of the skate which, in use, is centrally supported on the wheels 2.

Platform 1 is also provided with a pair of rollers 3 and 4, one located at each end. The roller 3 is supported from solid bracket 5 and shaft 5', while the roller 4 is preferably supported from the platform by a spring bracket 5ª and shaft 5ᵇ. This spring bracket 5ª yields sufficiently under pressure to permit such roller to contact with said platform, whereby the required friction is produced when so desired to stop the skate. The central wheels 2 are made much larger than the end rollers, whereby the end rollers are both free from contact with the floor or surface used. The central wheels 2 are each preferably supported upon a plurality of ball-bearings 6 which ball-bearings are preferably supported between the cones 7 and the recessed sides 8 of the wheel 2, whereby said wheels are driven with the least possible resistance.

The peripheries of wheels 2 are preferably covered with a metallic tire 9 and the upper part of the wheel 2 is shielded from contact with member 10, which member 10 forms a part of the platform.

Platform 1 includes the member 11 which extends downwardly at 12, and serves as a means of attaching the axle-bolt 13. The axle bolt serves also as a support for the axle-bearings 8.

14 are nuts which hold the axle-bearings 8 in place on said axle-bolt 13.

15 represents a person's foot which is secured to the skate by the strap 16, and said strap 16 extends above and crosses the foot at the points 17, 18, and 19, while it passes through the apertures 20 and beneath the hooks 21, upon each side of the platform. The end of such strap may be buckled or otherwise securely fastened, holding the skate to the foot.

Figure 4:
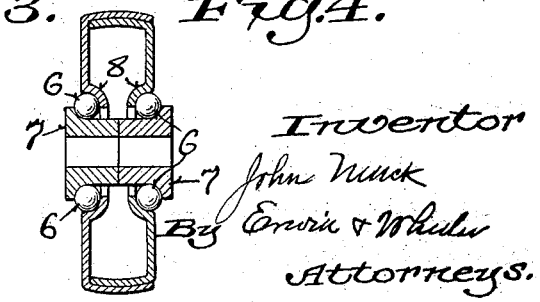
Fig. 4 represents a preferred form of the device.

In the preferred form shown in Fig. 4, the central part 2' is dispensed with and the wheel is preferably made hollow, as shown in said Fig. 4. The axle bearings 8 are preferably made in two such pieces which overlap each other at the periphery, whereby the tire 9 may be dispensed with.

Having thus described my invention, what I claim and desire to secure by Letters-Patent is:

1. A roller skate comprising a platform for the foot, a pair of wheels one at each side of the platform, a roller journaled at the front end, a second roller journaled at the rear, a looped spring mounting for the last mentioned roller and attached to the underside of the platform, whereby said roller may act as a brake for the skate, upon flexing the spring mounting and engaging the roller with the underside of the platform.

2. A roller skate comprising a platform for the foot, a plurality of wheels supporting the platform and journaled thereon, and a roller mounted in a spring bearing at the underside of the platform and at the rear of the supporting rollers, whereby said roller may act as a brake for the skate by flexing the spring mounting and engaging the roller with the underside of the platform.

In testimony whereof I affix my signature in the presence of two witnesses.

JOHN MUCK.

Witnesses:
O. C. WEBER,
JAS. B. ERWIN.